United States Patent Office 2,810,443
Patented Oct. 22, 1957

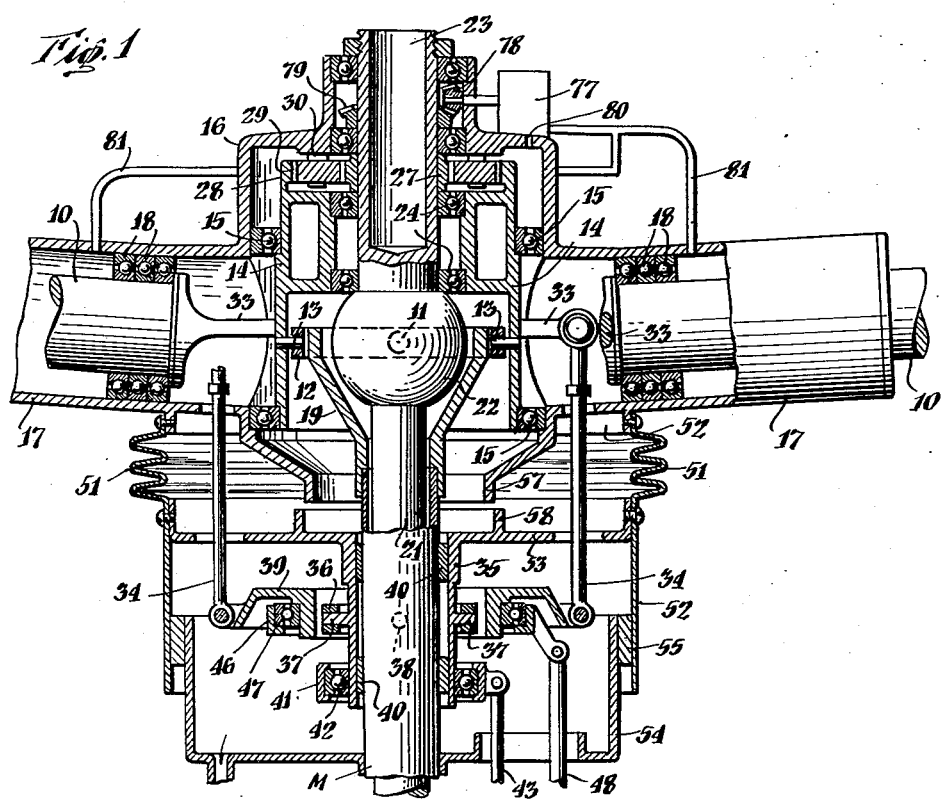

2,810,443

ROTOR HEAD AND SWASH PLATE MEANS COMBINATION

Glidden S. Doman, Danbury, Conn., assignor to Doman Helicopters, Inc., Danbury, Conn., a corporation of Delaware Application November 18, 1950, Serial No. 196,470

24 Claims. (Cl. 170—160.26)

The invention relates to a rotor head for self sustaining aircraft and the like such as a helicopter. The invention principally relates to an axially flexible driving connection between the rotor head hub and the azimuth or swash plate which controls the pitch change of the blades during the rotation of the head. The invention also comprises a combination of a rotor hub and a swash plate means. It has particular applicability with a rotor head in which the driving shaft extends through the mast and rotates faster than the head because of a gear reduction mechanism in the head between the drive shaft and the rotor hub. The invention also includes means to retain the rotor head against angular displacement when desired.

It is an object of the invention to construct a rotor head with an axially flexible drive connection between the rotor head hub and the azimuth or swash plate means.

Another object is to use a large diameter, axially flexible tube as the driving connection between the hub of a rotor head and the azimuth or swash plate means which is large in diameter so that it surrounds at least a portion of the operating parts to also form an oil shield or curtain for the head.

A still further object is to construct a rotor head having means to retain the rotor head against angular displacement.

Another object of the invention is to construct a rotor head having a driving connection between the rotor head hub and the swash plate means utilizing an axially flexible tube and which connection also serves as a rotor head retaining means.

Other objects of the invention will be apparent from the following description when taken in connection with the drawings illustrating some preferred embodiments of the invention in which:

Figure 1 is a section through the rotor head; and

Figure 2 is a section through a portion of the rotor head with another form of swash plate means utilizing the axially flexible driving connection.

The rotor head is adapted to be mounted upon a mast M and the mast is fixed to a fuselage (not shown) of an aircraft. The rotor head is mounted upon the mast for inclination of the head with respect thereto. The head may have two or more blades 10; however, that particularly illustrated is a four-bladed head, in which construction each blade is independently or separately controlled from the swash plate for its cyclic change of pitch upon the longitudinal axis of the blade.

The invention herein is applicable to any form of mounting for the rotor hub such as the rotatable universal joint exemplified in the Young Patent 2,256,918 and the non-rotating or fixed universal joint, the latter form being particularly illustrated herein. The universal joint likewise may be any form. The universal joint is adapted to be carried upon the mast, that particularly shown having a first bearing means 11 which pivotally secures a ring 12 to an end member 19 forming the end of the mast or the center part of the universal joint. The ring carries second bearing means 13 which is spaced 90° from the first bearing means, upon which bearing means a shell 14 is carried. The shell therefore is free to tilt universally in any direction and over any desirable angular range. The shell carries suitable bearings 15 upon which a rotor hub 16 is rotatably mounted. This hub may carry tubular projections 17 in each of which a blade or blade spar 10 is mounted upon bearings 18 for rotation about the longitudinal axis of the spar or blade. The blades preferably are fixed to the spar so that they are adjustable on the longitudinal axis only.

Within the mast M is a drive shaft 21 connected with the rotor head hub in any desired way that illustrated including a universal joint 22 connected with a stub shaft 23 which is mounted upon bearings 24 carried by the shell 14 for rotation in the shell and so that the stub shaft tilts therewith. The drive connection between the stub shaft and the rotor hub 16 may be of any suitable kind; that which is illustrated is a gear means although this is not essential. When gear means is provided it preferably is a gear reduction so that the drive shaft and its universal joint may be high speed and thereby reduce the torque in the drive shaft and enable a smaller drive shaft and universal joint to be used. A drive shaft universal joint which is a constant velocity type is better and in slow speed types it is quite large. The high speed shaft and joint reduce substantially the weight of the universal joint and drive shaft thereby reducing the over-all weight of the entire head. The gear drive connection between the stub shaft 23 and rotor head hub 16 particularly illustrated is a planetary gear system including a gear or pinion 27 carried by the stub shaft, a ring gear 28 carried by the shell and planetary gears 29 meshing with the stub shaft gear and the ring gear and rotatably mounted upon a pin 30 carried by the rotor head hub.

The blades or their spars 10 are oscillated on their longitudinal axis through a horn 33 which is secured to the spar of each blade, the end of which horn is affixed to a connecting link 34 extending to a swash or azimuth plate means. Two forms of swash or azimuth plate means are shown in Figures 1 and 2, that in Figure 1 having a rotating universal joint and that of Figure 2 being non-rotary or fixed. In Figure 1 a drive or control tube 35 carries a universal joint formed by a ring 36 which is pivoted to the tube on pivot means 27 and 90° therefore. The ring carries a second pivot means 38 upon which is mounted a first ring or an outer ring serving as an azimuth or swash plate 39. The tube is rotatably mounted upon the exterior of the mast by suitable bearings 40 and in addition the tube is movable vertically upon the mast which moves the entire swash or azimuth plate means therewith.

Vertical movement of the swash plate brings about collective pitch change of the blades in known fashion through the links 34 and horns 33; that is, all blades have their pitch changed in like amount and direction to increase or decrease the pitch thereof. Such vertical movement of the swash plate is secured through an operating ring 41 having an operating connection 43 which ring is mounted upon the drive tube 35 by a bearing 42 so that it does not rotate with the tube; however, vertical movement thereof moves the swash plate means vertically. The operating connection connects with suitable levers or the like (not shown) for raising and lowering the drive tube on the mast and retaining the same in adjusted position.

In order to secure cyclic pitch change of the blades, the swash or azimuth plate 39 is tilted with respect to the mast. This adjustment or tilt is secured through a second or an operating ring 46 mounted on bearings 47 carried by the azimuth plate so that by tilting the operating ring, the swash plate is tilted upon the universal joint. The operating ring is not rotatable with the swash plate. The operating ring is connected through an operating connection 48 or a pair of such operating connections to suitable operating means for tilting the swash plate in any direction upon its universal joint and retaining the same in adjusted position, if desired, or it may be free for maneuvering the aircraft.

In application S. N. 679,695 (now Patent No. 2,648,387 dated August 11, 1953), the azimuth or swash plate is driven directly from the drive shaft through an opening in the mast and since the drive shaft rotates at a higher speed than that of the rotor head, a separate gear reduction means is needed to drive the azimuth or swash plate shown therein. Furthermore the opening through the mast for the gear connection tends to weaken the mast. The drive connection herein is directly from the rotor head through an axially flexible tube or sleeve 51 forming a flexible tubular connection, one end of which is secured to the rotor hub such as by a rib or flange 52. The other end of the axially flexible tube is connected with a drive plate 53 carried by the drive tube of the swash or azimuth plate means. The axial flexibility of the tube does not restrict the rotor head from rotating in a plane angular with respect to the axis of the mast or in a plane not parallel with the swash plate. In addition the azimuth plate is rotated with the rotor head through the flexible connecting tube or sleeve which has sufficient tubular or circular rigidity for this driving connection so that the swash plate and rotor head rotate together and yet has ample axial flexibility so that the rotor head readily adjusts to any angular plane of rotation with respect to the axis of the mast without interference between the swash plate and the rotor hub which may not be and probably would not be in a parallel plane. Axial flexibility with relative circular rigidity is secured by circumferential corrugations in the connecting tube.

Preferably the flexible connecting tube 51 is large in diameter so that it encloses at least part of the swash plate means, the links 34 and the lower end of the rotor head. The corrugated tubular connection may have an extension 52 which may be an integral part as shown or a separate tubular skirt or shield extending below the rotating swash plate means and carries an oil seal 55 at the lower end thereof of any suitable kind. A fixed bottom or closing member 54 is adapted to be carried by the mast and engages the oil seal to permit rotation of the extension or skirt with respect to the fixed bottom member which serves as an oil pan. It will be observed, therefore, that the flexible drive tube or connection 51 not only forms a driving connection between rotor head and the swash plate but it also serves as a casing or housing around the operating parts of the swash or azimuth plate and connecting rods whereby the entire head may be lubricated in any way such as by spray, drip and the like, and the oil is retained within the casing so that it will not leak out onto the blades which would affect the stability and balance thereof.

A third function is served by the construction particularly illustrated in that the rotor hub carries a downwardly extending flange or lip 57. The connecting drive plate carries an upwardly extending flange or lip 58 which has a diameter to fit over the lip or flange carried by the hub so that their surfaces interengage. When the aircraft is on the ground, approaching or leaving the ground with the head rotating or if the rotor head is stationary, the swash or azimuth plate as well as the drive plate 53 may be projected upwardly until the inner surface of the flange 58 of the latter engages the outer surface of the flange 57 on the hub. The rotor head, therefore, is anchored or retained in horizontal position so that it cannot tilt while rotating, or stationary, on the ground and endanger incautious people. The ribs or flanges provide interengaging surfaces which need not be in the form of flanges.

Another form of construction of azimuth or swash plate means is illustrated in Figure 2 in which the universal joint thereof is non-rotary. A tube 61 is mounted on the mast for vertical movement thereon thereby raising and lowering the swash plate means for collective pitch adjustment of the blades as described for the construction of Figure 1. The connecting rods or links 34 are connected with a second ring serving as a swash or azimuth plate 62 which is rotatably mounted upon the outer or first ring 63 of the universal joint by means of the bearing 64. The ring 63 is mounted on bearing means 38 to the inner ring 36 which is mounted on the tube 61 by bearing means 37 which is spaced 90° from the bearing means 38. The tube is secured to the mast for non-rotation which permits vertical movement such as by the keying pin 63 carried by the mast and received in a slot in the tube.

An axially flexible drive tube 67 is directly connected with the swash plate such as by screws 68 and to the flange 52 of the hub to provide a driving connection between the rotor head hub and the swash plate. With this construction the universal joint does not rotate and the flexible drive tube provides an oil protecting shield or casing for the swash plate means between the rotor head and the azimuth plate.

The drive tube 67 may also carry an extension or skirt 71 extending downwardly to the bottom member 72 which has sufficient clearance to permit free movement of the swash plate and yet provides an oil closure. The bottom member is secured to the mast.

The tube 61 may carry a surface such as that provided by a bearing 74 for engagement with the lip or flange 57 on the rotor head hub. Upon upward movement of the swash plate means beyond that required for collective pitch control the surfaces of the bearing and flange 57 engage to retain the head in a fixed horizontal plane.

It will be noted that in the two forms of construction illustrated that the swash plate means includes a first ring forming a part of the swash plate universal joint and a second ring mounted on the first ring so that it is movable angularly therewith but one ring is rotatable relatively to the other. One ring serves as the swash plate for connection with the blades and the other ring serves as a control ring by means of which the angular position of the swash plate with respect to the mast may be adjusted. With a rotating swash plate universal joint which rotates as in Figure 1 it is the first ring which serves as the swash plate and for a non-rotating universal joint as in Figure 2 it is the second ring which becomes the swash plate.

An oil pump 77 may be carried by the head and driven through gears 78 and 79 from the stub shaft 23. The oil may be sprayed into the top of the head through a connection 80 therewith so that the oil flows through the head oiling all parts on its way to the pan or bottom member 54. Oil connections 81 may direct oil to other parts such as the blade bearings.

This invention is presented to fill a need for improvements in a rotor head and swash plate means combination. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A rotor head for self sustaining aircraft and the like having a mast comprising a universal joint for a rotor hub adapted to be mounted upon the mast, a blade hub carried by the universal joint, blades mounted upon the blade hub for pitch angle change upon the longitudinal axis of each blade; swash plate means connected with the blades to change the pitch angle of the latter and adapted to be carried by the mast including a universal joint having an outer ring, a second ring mounted upon the outer ring of the universal joint for relative rotation therebetween, one of the rings being a swash plate and the other an adjusting ring, and a connection between the swash plate and each blade; an axially flexible driving tube connecting the blade hub with the swash plate means to rotate the swash plate with the rotor hub, a drive shaft extending through the universal joint for the blade hub, and a driving connection between the drive shaft and blade hub.

2. A rotor head as in claim 1 in which the flexible driving tube has a diameter and length to surround the swash plate means to form a housing therefor.

3. A rotor head as in claim 1 including an interengaging surface carried by the rotor hub and the swash plate means engageable upon upward movement of the latter to retain the rotor head in fixed position.

4. A rotor head as in claim 3 including a flange carried by the rotor hub and by the swash plate means providing the interengaging surfaces.

5. A rotor head for self sustaining aircraft and the like having a mast comprising a universal joint adapted to be mounted upon the mast and held against rotation with respect thereto, a shell carried by the joint, a blade hub rotatably mounted upon the shell, blades mounted upon the blade hub for pitch angle change upon the longitudinal axis of each blade; swash plate means connected with the blades to change the pitch angle of the latter and adapted to be carried by the mast including a universal joint having an outer ring, a ring mounted upon the outer ring of the universal joint, a connection between one of the rings and the blades, and a bearing between the rings rotatably mounting one ring relatively to the other; a drive shaft extending through the shell and having a universal joint coaxial with the shell joint whereby the shaft has an inclinable portion, a bearing carried by the shell and supporting the inclinable portion of the drive shaft, a driving connection between the drive shaft and rotor hub, and an axially flexible driving tube connecting the blade hub with the swash plate means.

6. A rotor head as in claim 5 in which the flexible driving tube has a diameter and length to surround the swash plate means and serves as a housing therefor.

7. A rotor head as in claim 6 including a tubular shield extending from the flexible driving tube around the swash plate means, an end cover carried by the mast and closing the end of the tubular shield, and an oil seal between the tubular shield and the end cover.

8. A rotor head for self sustaining aircraft and the like having a mast comprising a universal joint adapted to be mounted upon the mast and held against rotation with respect thereto, a shell carried by the joint, a rotor hub rotatably mounted upon the shell, blades mounted upon the rotor hub for pitch angle change upon the longitudinal axis of each blade and with a fixed mounting with respect to all other angular positions; swash plate means to change the pitch angle of the blades including a control tube adapted to be mounted upon the mast for at least vertical adjustment thereon, a universal joint carried by the control tube including a first ring, and a second ring mounted upon the first ring, one ring being a swash plate and the other ring being a control ring having angular movement; a link connecting each blade with the swash plate; a drive shaft extending through the shell and having a universal joint coaxial with the shell joint whereby the shaft has an inclinable portion, a bearing carried by the shell and supporting the inclinable portion of the drive shaft, a driving connection between the drive shaft and rotor hub, and a drive connection between the swash plate and the rotor hub including an axially flexible tube.

9. A rotor head for self sustaining aircraft and the like having a mast comprising a universal joint adapted to be mounted upon the mast and held against rotation with respect thereto, a shell carried by the joint, a rotor hub rotatably mounted upon the shell, blades mounted upon the rotor hub for pitch angle change upon the longitudinal axis of each blade and with a fixed mounting with respect to all other angular positions; swash plate means to change the pitch angle of the blades including a control tube adapted to be mounted upon the mast for vertical adjustment thereon, a universal joint carried by the control tube including a swash plate and a control ring mounted upon the swash plate for control of the angular movement of the swashplate; and a link connecting each blade with the swash plate; a drive shaft extending through the shell and having a universal joint coaxial with the shell joint whereby the shaft has an inclinable portion, a bearing carried by the shell and supporting the inclinable portion of the drive shaft, a driving connection between the drive shaft and rotor hub, and a drive connection between the control tube and the rotor hub including an axially flexible tube.

10. A rotor head as in claim 9 in which the tubular connection has a diameter to surround the swash plate connection to also serve as a shield.

11. A rotor head as in claim 9 in which the drive connection between the swash plate means and the rotor hub includes a drive plate connected with the control tube and the rotor hub.

12. A rotor head as in claim 11 including a shield carried by the drive plate and having a diameter to surround and a length to extend past the swash plate, and a bottom member adapted to be fixed to the mast and forming an enclosing casing with the shield and axially flexible tube.

13. A rotor head as in claim 11 including a flange carried by the rotor hub at the bottom thereof, and a flange carried by the drive plate and movable therewith into interengagement with the flange on the rotor hub.

14. A rotor head for self sustaining aircraft and the like having a mast comprising a universal joint adapted to be mounted upon the mast and held against rotation with respect thereto, a shell carried by the joint, a rotor hub rotatably mounted upon the shell, blades mounted upon the rotor hub for pitch angle change upon the longitudinal axis of each blade and with a fixed mounting with respect to all other angular positions; swash plate means to change the pitch angle of the blades including a control tube adapted to be mounted upon the mast for vertical adjustment alone thereon, a universal joint carried by the control tube including a control ring, a swash plate mounted upon the control ring for rotation thereon and for angular movement therewith; a link connecting each blade with the swash plate, a drive shaft extending through the shell and having a universal joint coaxial with the shell joint whereby the shaft has an inclinable portion, a bearing carried by the shell and supporting the inclinable portion of the drive shaft, a driving connection between the drive shaft and rotor hub, and an axially flexible tube connecting the swash plate and the rotor hub.

15. A rotor head as in claim 14 in which the axially flexible tube has a diameter to surround the swash plate means to also serve as a shield.

16. A rotor head as in claim 15 including a bottom member enclosing the end of the axially flexible tube and adapted to be carried by the mast and forming a housing with the axially flexible tube.

17. A rotor hub and swash plate means combination for self sustaining aircraft and the like having a mast comprising a rotor hub adapted to be mounted upon a mast for rotation, blade bearings carried by the rotor hub for pitch angle change upon the longitudinal axis of each blade; swash plate means including a control tube adapted to be mounted upon the mast for at least vertical adjustment thereon, a universal joint carried by the control tube including a first ring, and a second ring mounted upon the first ring for angular movement only, one ring being a swash plate and the other ring being a control ring; and a drive connection between the swash plate and the rotor hub including an axially flexible tube.

18. A rotor hub and swash plate means combination as in claim 17 in which the first ring is a swash plate and the second ring is the control ring, and the driving connection between the rotor hub and the swash plate is to the control tube.

19. A rotor hub and swash plate means combination as in claim 18 including a drive plate carried by the control tube and the axially flexible tube is connected with the drive plate.

20. A rotor hub and swash plate combination as in claim 19 including the drive plate being carried on the upper end of the control tube, and an extension carried by the axially flexible tube extending below the control tube and around the swash plate means.

21. A rotor hub and swash plate combination as in claim 20 including a bottom member closing the open bottom end of the axially flexible tube and permitting rotation of the latter and adapted to be carried by the mast.

22. A rotor hub and swash plate combination as in claim 17 in which the first ring is a control ring and the second ring is a swash plate, and the axially flexible tube is connected with the swash plate.

23. A rotor hub and swash plate combination as in claim 22 including a bottom member enclosing the open end of the axially flexible tube and permitting rotation of the latter and adapted to be carried by the mast.

24. A rotor hub and swash plate means combination as in claim 17 including interengaging means carried by the hub and the control tube engageable upon vertical movement of the latter to retain the rotor hub in fixed position.

References Cited in the file of this patent

UNITED STATES PATENTS

| | | |
|---|---|---|
| 2,163,893 | Schairer | June 27, 1939 |
| 2,264,942 | Larsen | Dec. 2, 1941 |
| 2,410,963 | Chappedelaine | Nov. 12, 1946 |
| 2,428,200 | Campbell | Sept. 30, 1947 |
| 2,444,070 | Stanley | June 29, 1948 |
| 2,537,623 | Campbell | Jan. 9, 1951 |
| 2,648,387 | Doman | Aug. 11, 1953 |

FOREIGN PATENTS

| | | |
|---|---|---|
| 948,219 | France | July 26, 1949 |